United States Patent
Khawer

(10) Patent No.: US 6,885,743 B2
(45) Date of Patent: Apr. 26, 2005

(54) SOFTWARE CIRCUIT SWITCHING ROUTER USING ANCHOR CHANNELS

(75) Inventor: Mohammad Riaz Khawer, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 629 days.

(21) Appl. No.: 09/759,887

(22) Filed: Jan. 16, 2001

(65) Prior Publication Data

US 2002/0122384 A1 Sep. 5, 2002

(51) Int. Cl.⁷ ................................................ H04M 7/00
(52) U.S. Cl. ......................... 379/221.06; 379/221.03; 379/221.04; 379/221.07
(58) Field of Search ..................... 379/221.03, 221.04, 379/272, 273, 167.14, 219, 220.01, 221.01, 221.06, 221.07; 455/67.11, 423, 424, 425, 445, 450

(56) References Cited

U.S. PATENT DOCUMENTS

| | | | | |
|---|---|---|---|---|
| 4,451,916 A | * | 5/1984 | Casper et al. ................. 714/4 |
| 5,130,982 A | * | 7/1992 | Ash et al. ................. 370/352 |
| 5,148,364 A | * | 9/1992 | Scherer ................. 700/82 |
| 5,828,652 A | * | 10/1998 | Bales et al. ................. 370/225 |
| 5,991,263 A | * | 11/1999 | Bales et al. ................. 370/225 |

* cited by examiner

Primary Examiner—Bing Q. Bui

(57) ABSTRACT

Software defined radios necessitate the routing of analog wireless signals between data links via a software circuit switching router implemented in a processor. Processor utilization by the software router is decreased by disabling the interrupts of all but one analog channel per communication link, this channel being termed the Anchor channel for its link. Data from all channels in the link is transferred during the Anchor link's interrupt. The increase in the Anchor channel's interrupt latency due to transferring data from other channels is more than offset by the overall reduction in the number of processor interrupts generated. As a result, utilization of the processor by the software router is reduced, allowing the processor to manage other time-critical tasks and/or a greater number of tasks in a given time period.

15 Claims, 4 Drawing Sheets

SOFTWARE CIRCUIT SWITCHING ROUTER USING ANCHOR CHANNELS

BACKGROUND OF THE INVENTION

1. Field of the Invention

The present invention relates to wireless communication systems, and more specifically, to an implementation of a software router for routing signals among various channels within and between data links.

2. Description of the Related Art

Analog wireless calls, carrying, for example, 64 kilobits/sec of Pulse Code Modulated (PCM) data, require an end-to-end dedicated circuit switched path for the entire duration of the call. This switched path is typically between communication channels, either within a communication link, or between different communication links. For the purposes of discussion, a communication link will be assumed to contain 10 communication channels, although other links with more or less channels are possible.

This dedicated circuit switched path has conventionally been provided via a hardware router or another hardware-based implementation for performance and voice quality reasons. The router may be located in, for example, a base station, although other locations within a wireless communication system are possible depending on a configuration of the system. However, the recent advent of software defined radios have necessitated other implementations of these routers.

"Software defined radios" refer to a radio whose personality may be changed to either digital or analog via software. An example of such a radio is one capable of operating using either an analog protocol or a digital protocol, such as TDMA. The introduction of such software defined radios has made it necessary to provide some segments of the dedicated circuit switched path for an analog call via software.

FIG. 1 shows a block diagram of an Analog/PCM software circuit switching router 100. In the implementation shown, the router supports two links 10 and 20, each having 10 channels, for a total of 20 channels. Shown in FIG. 2 are possible exemplary mappings of various channels in each link. In general, a channel on one link may be connected to a channel on another link, such a channel 1 on link 10 connected to channel 10 on link 20 as shown. Alternately, a channel may be connected to another channel on the same link, such as channels 8 and 10 on link 10 or channels 3 and 6 on link 20. Another possible configuration is routing a channel to itself, as shown for channel 5 on link 10 and channel 1 on link 20. All of these channel mappings are determined by routing software implemented in a processor or computing unit, such as the MPC860 processor manufactured by Motorola, Inc.

Because these channels are carrying analog/PCM voice data, the software router 100 needs to move data serially from its source to destination channel with no protocol superimposition, or other interruption or delay of the data. Channels which need to move data (e.g., PCM data and other data which must remain continuous) in such an uninterrupted manner will be termed "analog channels," which are distinct from, e.g., "digital channels" which carry packetized data in a discontinuous manner. To maintain this uninterrupted data, a "transparent mode" protocol is used to operate these analog channels. Transparent mode provides a clear channel on which a Serial Communication Controller (SCC) of the processor implementing the routing software does not perform any bit-level manipulation. Such modes are necessarily processor-dependent in their implementation, and it is envisioned that other processors besides the MPC860 processor will operate in a similar mode when running a software router.

The two links 10 and 20 of the router 100 have an 8 kHz Frame Sync pulse in the following example. This means that a byte of data is transmitted/received every 125 microseconds on these links. The data is received by the SCC device of the MPC860 processor, where it gets buffered. Once the specified number of bytes are buffered for the transparent mode channel, the SCC generates an interrupt to the main core of the MPC860 processor for further processing, e.g., data routing to establish circuit switching. In one possible implementation, each transparent mode channel is configured to buffer 64 bytes prior to transferring the data to a corresponding destination channel. Thus, each transparent channel generates an interrupt every 8 milliseconds, because 125 microseconds*64 bytes=8 milliseconds. The number of bytes to buffer may be chosen according to a compromise between performance and quality. A smaller number of buffered bytes would cause performance degradation due to higher interrupt activity and consequently higher context switch overhead. A larger number of buffered bytes, on the other hand, would result in poor voice quality due to echoing on the line.

Since in the above example, each of the transparent channels of each link is configured to buffer 64 bytes, 20 interrupts (one for each channel) will be generated by the SCC every 8 milliseconds. To achieve acceptable circuit switching, the 64 bytes received on each channel needs to be transmitted to its corresponding mapped destination channel as illustrated, for example, in FIG. 2. This conventional, one interrupt per channel scheme results in the following processor utilization due solely to the software router.

Over a time period of 1 second (=1000 milliseconds), the number of interrupts (NUM) generated is 2500 (=10 interrupts per link every 8 milliseconds). The software router has an overhead associated with each interrupt, which is 54 microseconds in this example. Further, there is a latency of 50 microseconds associated with each channel's interrupt to route the 64 bytes per channel. Hence, the percentage of processor utilization of just the software router may be expressed as follows:

$$CPU \text{ Utilization} = ((\text{Overhead} + \text{Latency}) * NUM)/\text{Time Period} \quad (1)$$

$$= ((54 \text{ microseconds} + 50 \text{ microseconds}) * 2500)/$$

$$1000 \text{ milliseconds}$$

$$= 0.265 \ (26.5\%)$$

Thus, a conventional software router between two links of 10 analog channels in the example above may utilize over one quarter of a processor's resources. This is a significant amount of load, considering that the processor where this router resides, has to support numerous other time critical tasks.

SUMMARY OF THE INVENTION

The present invention provides software and methodology for routing analog wireless signals between data links via a software circuit switching router implemented in a processor. Processor utilization by the software router is decreased by disabling the interrupts of all but one analog channel per communication link, this channel being termed the Anchor channel for its link. Data from all channels in the link is transferred during the Anchor channel's interrupt. The increase in the Anchor channel's interrupt latency due to transferring data from other channels is more than offset by the overall reduction in the number of processor interrupts generated.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
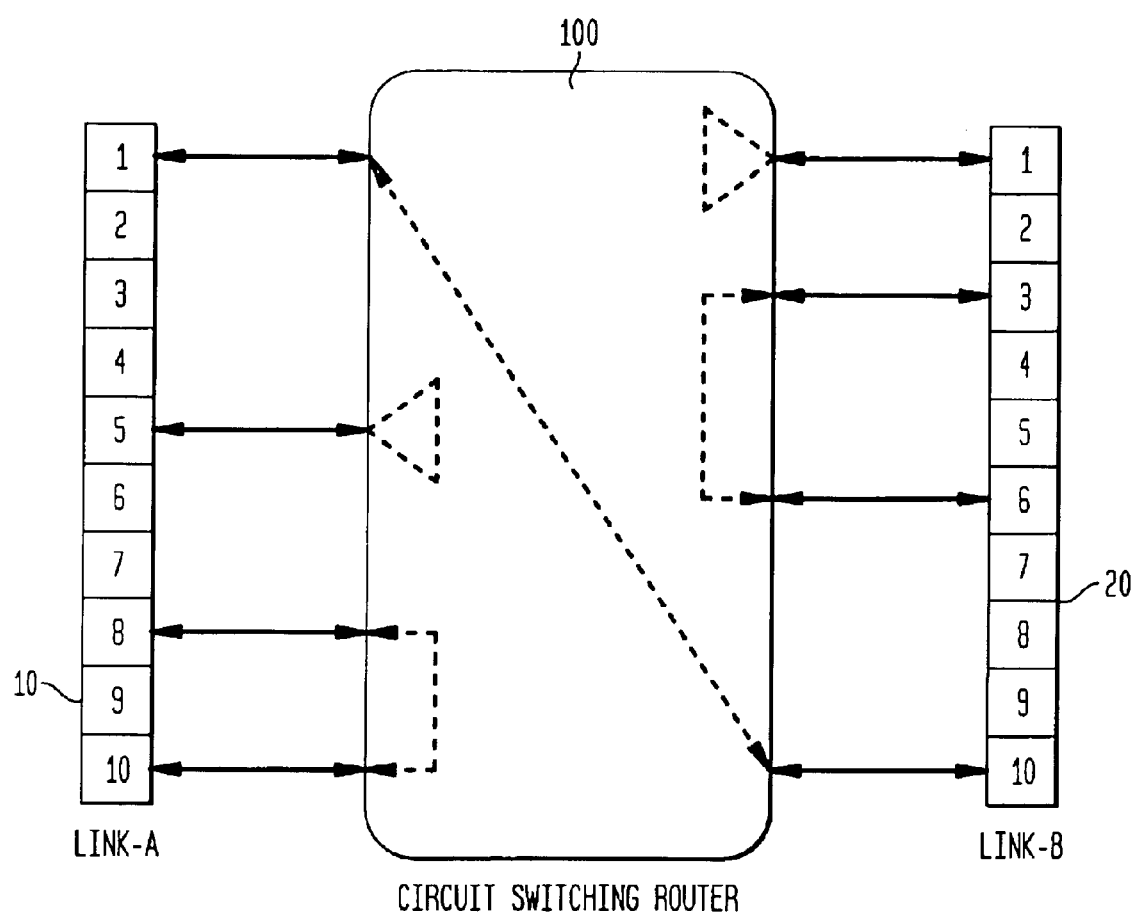
FIG. 1 illustrates a wireless communication system containing a software circuit switching router.

Reference will now be made in detail to the preferred embodiments of the present invention, examples of which are illustrated in the accompanying drawings. Where possible, the same reference numerals will be used to illustrate like elements throughout the specification.

To optimize the performance of the conventional software circuit switching router, one channel per link is designated as an "Anchor Channel." The Anchor Channel is defined as the one channel per link which retains an enabled interrupt. The remaining channels in the link besides the Anchor Channel have their respective interrupts disabled. The interrupts may be disabled on these "other channels" for the following reasons.

Since all the channels on each link are synchronized with each other (i.e., have the same frame sync pulse), and because all of them are programmed to buffer the same number of bytes, all the channels on each link will generate an interrupt at the same time upon receiving 64 bytes. By disabling interrupts of all but one channel per link, only one interrupt will occur every 8 milliseconds per link, instead of 10 interrupts per link as in the conventional software router.

When the Anchor Channel generates an interrupt, data routing to achieve circuit switching is performed for all the 10 channels on the link. This new strategy reduces the overall number of interrupts by 90%. However, the anchor channel's interrupt latency increases significantly, because it has to process the data from 10 channels instead of just one channel. The 90% reduction in the overall number of interrupts per second, and the associated savings in processor operating system's router overhead, more than compensates for this increased latency during the interrupt. The net effect of designating Anchor Channels on each link as described above significantly reduces processor utilization, as will be apparent from the following example.

The following example illustrates the relative improvement in processor utilization over the conventional software router described earlier. Over a time period of 1 second (=1000 milliseconds), the number of interrupts (NUM) generated by the current Anchor Channel invention is 250 (=only 2 interrupts per link every 8 milliseconds). The software router has an overhead associated with each interrupt, which is also 54 microseconds as in the above example. The latency associated with each channel's interrupt to route the 64 bytes per channel is of 500 micro seconds, because all 10 channels of data must be transferred during the Anchor Channel's interrupt. Hence, the percentage of processor utilization of the software router according to the present invention may be expressed as follows:

$$CPU\ \text{Utilization} = ((\text{Overhead} + \text{Latency}) * NUM) / \text{Time Period} \quad (1)$$

$$= ((54\ \text{microseconds} + 500\ \text{microseconds}) * 250) /$$

$$1000\ \text{milliseconds}$$

$$= 0.138\ (13.8\%)$$

An Analog/PCM software circuit switched router with Anchor Channels in the above example results in 46.9% reduction in CPU utilization compared to that of a conventional software circuit switching router implementation. This performance optimization is all the more important in lieu of the advent of the software defined radios where the personality/technology of the radio could be changed on the fly to either Digital or Analog mode. An example of this is a combination TDMA/Analog base station, and a next generation product like a Wide Band-ready base station.

Figure 2:
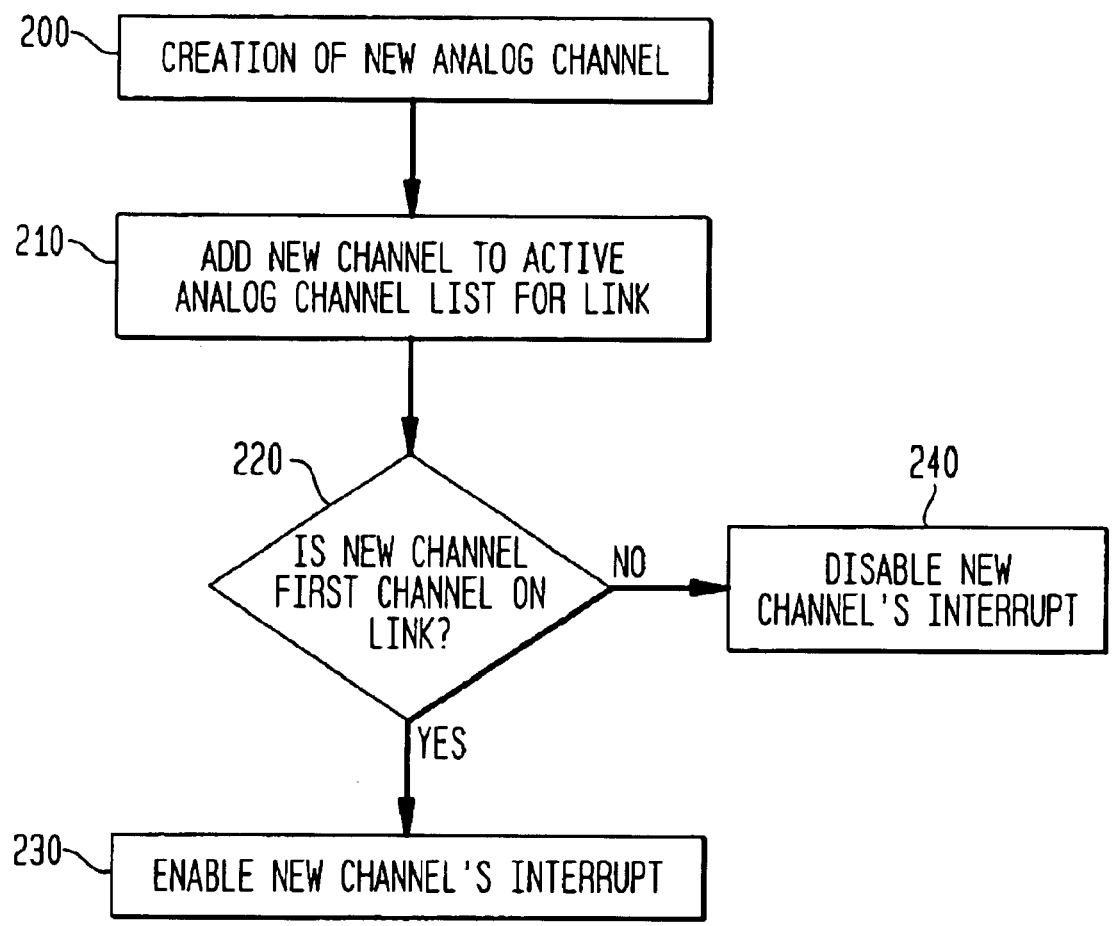
FIG. 2 illustrates a method for adding a channel to the software circuit switching router.
Figure 3:
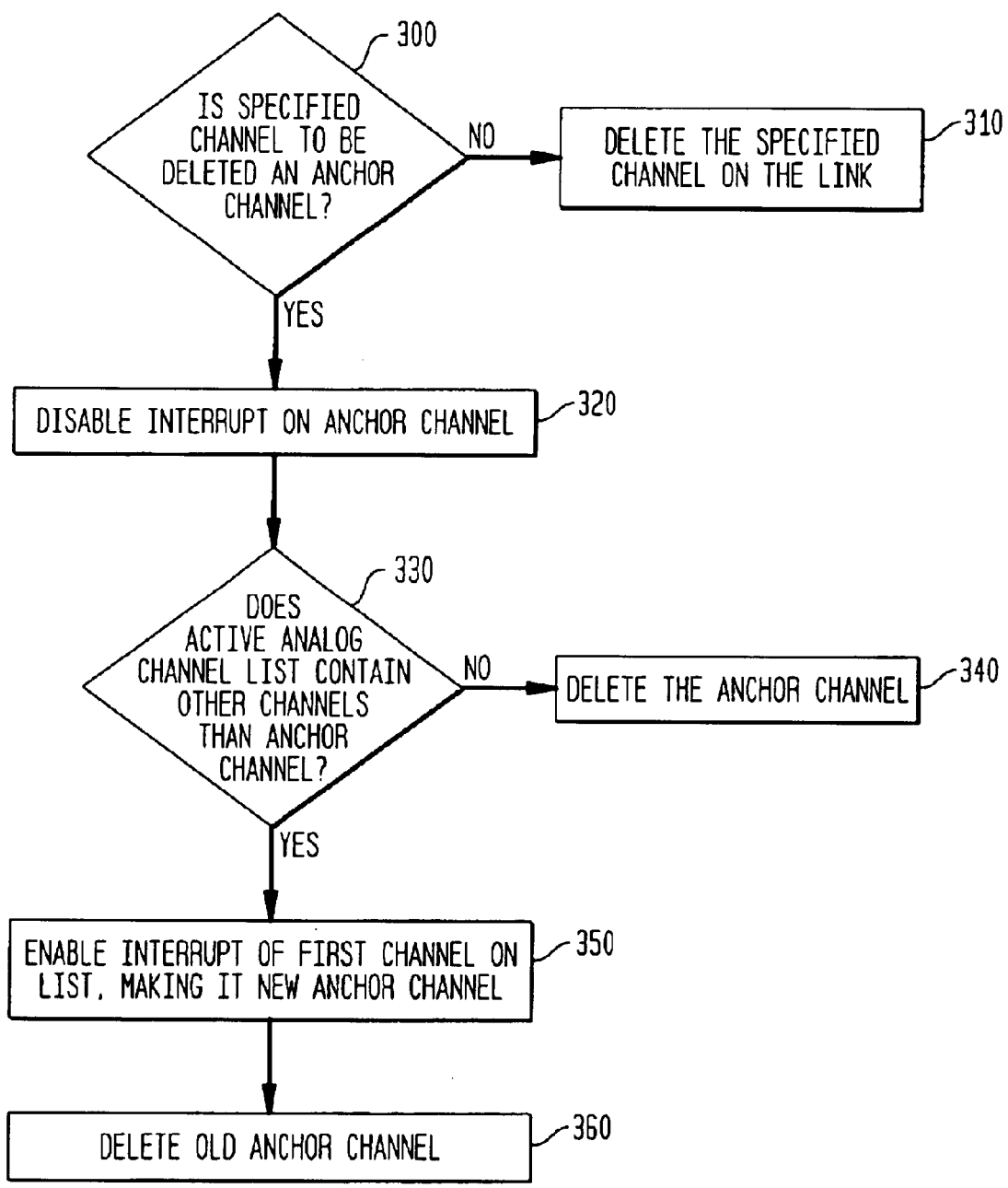
FIG. 3 illustrates a method for deleting a channel from the software circuit switching router.
Figure 4:
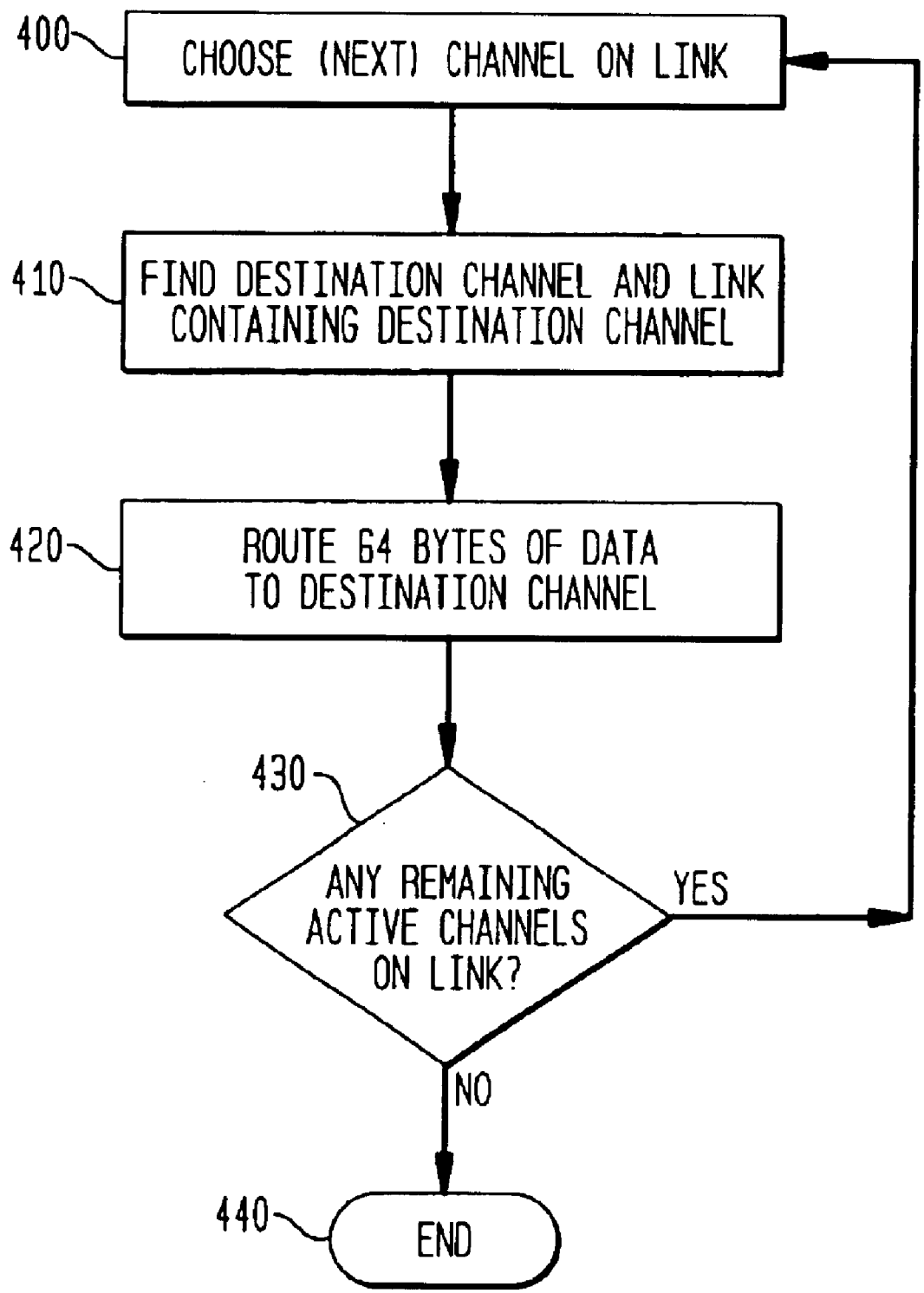
FIG. 4 illustrates a method of transferring data once the Anchor channel's interrupt occurs.

FIG. 2, FIG. 3, and FIG. 4 each show the order of performing various operations of the router with anchor channels. FIG. 2 illustrates a method for adding a channel to the software circuit switching router. In step 200, a new analog channel is established on the link by the software router. Then in step 210 the new channel is added to the list of active analog channels for the particular link which includes the channel. Next, the router determines in step 220 whether or not the new channel is the first analog channel established on the link. If so, then the software router enables the new analog channel's interrupt in step 230. If the new channel is not the first analog channel on the link, then the software router disables the channel's interrupt in step 240.

FIG. 3 illustrates a method for deleting a channel from the software circuit switching router. In step 300, it is determined whether the specified channel to be deleted is an Anchor channel. If not, then the specified channel is deleted in step 310. However, if the specified channel is an Anchor channel, then its interrupt is disabled in step 320. Next, the active channel list for the link in question is examined to determine if the list contains other channels than the Anchor channel in step 330. If there are no other channels on the list, then the Anchor channel is deleted in step 340. If, on the other hand, there are other channels in the list, then the interrupt of the first such channel is enabled in step 350, making it the New Anchor channel. After the designation of the New Anchor channel, the old Anchor channel is deleted in step 360.

FIG. 4 illustrates a method of transferring data once the Anchor channel's interrupt occurs. As explained above, all of the active channels on a link transfer their data when the Anchor channel's interrupt occurs. Thus, when the Anchor channel's interrupt occurs, a channel on the link is chosen for data transfer in step 400. This first channel chosen for data transfer may, but need not, be the Anchor channel. This first channel to transfer data may alternately be chosen as, e.g., the first channel on the list of active channels. The chosen channel finds its destination channel and corresponding destination link in step 410. Next the chosen channel transfers, e.g., 64 bytes of data to the destination channel in step 420. It is determined in step 430 whether there are any remaining active channels on the list which have not transferred their data. If there are no remaining active channels on the list which have not transferred their data, the operation is completed in step 440 and the processor may be released, if, however, there are remaining active channels on the link which have not transferred their data, then the interrupt remains enabled, and another channel is chosen for data transfer in step 400.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. For example, although the present invention has been discussed in the context of analog wireless channels, it is applicable to any type of signal (e.g., one whose data cannot be interrupted or delayed, such as PCM data) whose characteristics require a software router. Also, the present invention is not limited to the two-link case discussed in the examples above, but also applies to routing among a larger number of links.

Further, although the above description describes in detail one Anchor channel per link, those skilled in the art will appreciate that a plurality of such channels with enabled interrupts may be present in a link for various design reasons. Having, for example, only two (or some number less than all) channels with enabled interrupts may entail lower performance relative to the single Anchor channel case, but will still improve performance relative to the conventional scheme where each analog channel's interrupt is enabled.

Moreover, the one Anchor channel per link scheme described above assumes the prevalent mode of operation where the data links are not synchronized with each other. However, if two or more data links are synchronized via hardware or some other technique, only one Anchor channel would suffice for the entire software router, and data from all analog channels in the router would be transferred when the Anchor channel's interrupt occurs. Other variations or modifications than those described above are possible without departing from the spirit of the invention. Accordingly, the scope of the invention shall be determined only by the appended claims and their equivalents.

What is claimed is:

1. A method for routing data from one or more analog channels on a data link to corresponding receiving channels via a software router implemented on a processor, the method comprising:

enabling an interrupt for only one of the one or more analog channels on the data link; and transferring data from each analog channel on the data link to corresponding receiving channels when the interrupt occurs.

2. The method of claim 1, wherein the enabling step includes adding an analog channel to the data link, including:

creating a new analog channel;

adding the new analog channel to an active channel list for the data link; and enabling the interrupt of the new analog channel if the new analog channel is a first analog channel in the data link.

3. The method of claim 2, further comprising:

disabling the interrupt of the new analog channel if the new analog channel is not the first analog channel in the data link.

4. The method of claim 1, wherein the enabling step includes deleting a specified analog channel from the data link, including:

determining whether the specified analog channel to be deleted has an enabled interrupt; and deleting the specified analog channel if its interrupt is not enabled.

5. The method of claim 4, wherein when the interrupt of the specified channel is enabled, the deleting step further includes:

disabling the interrupt of the specified analog channel to be deleted if the interrupt is initially enabled; and deleting the specified analog channel if an active channel list for the data link does not contain a channel other than the specified analog channel.

6. The method of claim 5, wherein the deleting step further includes:

enabling an interrupt of a first analog channel on the active channel list if the active channel list for the data link contains a channel other than the specified analog channel.

7. The method of claim 1, wherein the transferring step includes, for each active channel on the data link:

finding a corresponding receiving channel and data link corresponding thereto; and routing data from the active channel to the corresponding receiving channel.

8. An article of manufacture including software embodied on a computer-readable medium for routing data from one or more analog channels on a data link to corresponding receiving channels, the computer-readable-medium-embodied-software comprising:

a first program segment for enabling an interrupt for only one of the one or more analog channels on the data link; and a second program segment for transferring data from each analog channel on the data link to corresponding receiving channels when the interrupt occurs.

9. The article of claim 8, wherein the first program segment includes:

a third program segment for creating a new analog channel;

a fourth program segment for adding the new analog channel to an active channel list for the data link; and a fifth program segment for enabling the interrupt of the new analog channel if the new analog channel is a first analog channel in the data link.

10. The article of claim 8, wherein the fifth program segment disables the interrupt of the new analog channel if the new analog channel is not the first analog channel in the data link.

11. The article of claim 8, wherein the first program segment includes:

a sixth program segment for determining whether the specified analog channel to be deleted has an enabled interrupt; and a seventh program segment for deleting the specified analog channel if its interrupt is not enabled.

12. The article of claim 11, wherein the first program segment includes:

an eighth program segment for disabling the interrupt of the specified analog channel to be deleted when the sixth program segment determines that the interrupt of the specified channel is enabled; and a ninth program segment for deleting the specified analog channel if an active channel list for the data link does not contain a channel other than the specified analog channel.

13. The article of claim 12, wherein first program segment includes:

a tenth program segment for enabling an interrupt of a first analog channel on the active channel list if the active channel list for the data link contains a channel other than the specified analog channel.

14. The article of claim 8, wherein the second program segment includes:

an eleventh program segment for finding a corresponding receiving channel and data link corresponding thereto; and a twelfth program segment for routing data from the active channel to the corresponding receiving channel.

15. A method for routing data from a plurality of analog channels on a data link to corresponding receiving channels via a software router implemented on a processor, the method comprising:

enabling interrupts for less than all of the plurality of analog channels on the data link;

disabling interrupts for remaining channels of the plurality of analog channels on the data link; and transferring data from the remaining channels on the data link to corresponding receiving channels when the interrupts of the less than all of the plurality of analog channels occur.

* * * * *